UNITED STATES PATENT OFFICE.

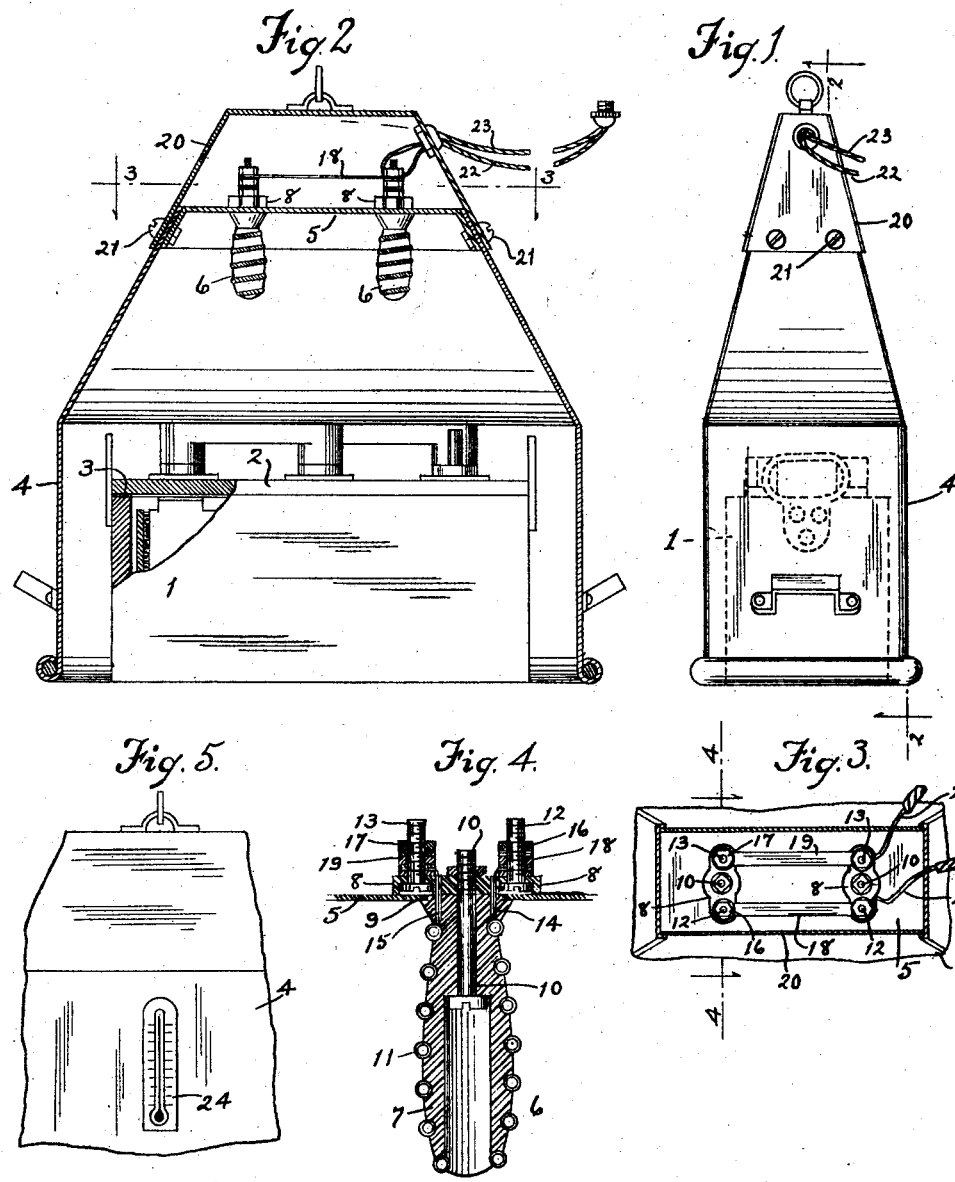

U D. STRAW, OF GOSHEN, INDIANA.

ELECTRIC HEATER.

1,420,160.  Specification of Letters Patent.  Patented June 20, 1922.

Application filed September 13, 1920. Serial No. 410,034.

*To all whom it may concern:*

Be it known that I, U D. Straw, a citizen of the United States, residing in the city of Goshen, county of Elkhart, Indiana, have invented certain new and useful Improvements in Electric Heaters, of which the following is a specification.

My invention relates to electric heaters and especially to heaters for use in opening electric storage batteries.

As is well known, electric storage batteries have a removable cover therefor which cover is usually sealed to the battery casing in some manner. The present practice in that respect is to use a fusible sealing wax of some kind, and when removal of the battery cover is desired, or necessary, to gain access to the battery plates, steam or hot water is used to melt the sealing wax between the battery cover and casing. This process is very disagreeable, unclean and frequently expensive.

An object of my invention is to provide an electrically heated cabinet within which the storage battery may be placed to melt the sealing wax sealing the battery cover to the casing to enable the ready removal of the cover from the latter. Other objects of my invention are mentioned and described herein.

The preferred embodiment of my invention is illustrated in the accompanying drawing in which Figure 1 is an end elevation of the heater cabinet; Fig. 2 is a section taken on the line 2—2 of Fig. 1; Fig. 3 is a section taken on the line 3—3 of Fig. 2; Fig. 4 is a section taken on the line 4—4 of Fig. 3; and Fig. 5 is a fragmental view showing a thermometer applied to the cabinet.

Similar numerals of reference indicate like members throughout the several views on the drawing.

Referring to the drawing in detail the numeral 1 indicates generally an electric storage battery casing which is provided with a removable top cover 2, the latter being adapted to be fastened to the former in any suitable manner and sealed with a fusible sealing wax or material 3 introduced between the cover and the battery casing to render the battery interior impervious to air, atmospheric conditions, or deleterious elements.

The numeral 4 indicates a cabinet or box-like member which may be open at the bottom to enable the ready encompassment or enclosure of the battery casing 1. The cabinet 4 may have a top wall 5 in which the electric heating elements 6, 6 are mounted to depend therefrom into the cabinet interior. One or more of the heating elements 6 may be used according to the size of the cabinet and the rapidity with which it is desired to raise the temperature within the cabinet. Each of the elements 6 may consist of a coil carrier 7, made of any suitable insulating material, a cap member 8, also made of any suitable insulating material, connected with the body member 7 through the wall aperture 9 and secured together by the bolt 10. An electric resistance coil 11 is mounted upon the member 7. Terminals 12 and 13 are carried by the cap member 8 with which the ends 14 and 15 of the coil 11 are connected, said terminals being insulated from the wall 5 in the cap 8 and provided with the binder nuts 16 and 17 threaded thereon.

In the structure illustrated two of the heater elements 6 are shown the terminals whereof are connected by the parallel electric current conductor links 18 and 19 secured thereto by the binder nuts 16 and 17. A cover member 20 may be detachably secured to the cabinet 4 over the cabinet top wall 5 by bolts 21 or other suitable fastener members, to enable ready access to the terminals 12 and 13 and the bolt 10 of the heater elements.

Electric current conduit wires 22 and 23 may be connected with either set of the terminals 12 and 13 which wires may be connected with any suitable source of electric current.

Numeral 24 indicates a thermometer mounted in the cabinet wall to readily determine the temperature within the cabinet.

In the practical application of my invention I have found that it is especially valuable in an automobile garage not only for opening storage batteries but also for many repair jobs such as drying reshellacked armatures of electric generators, drying out cork floats for carburetors for reshellacking, and the like.

I claim:

1. In a heater for the purpose specified the combination with a casing for inclosing the article to be heated, of an electric heater element extending into said casing and having binding posts on the outside thereof, a cover for said binding posts detachably secured to the casing, and an electric conductor carried by said detachable cover for connection to said binding posts.

2. In a heater for the purpose specified, the combination with a casing open at the bottom to be set down over the article to be heated, of an electric heater element mounted on and extending into said casing, and means for connecting said heater element with a source of electric current.

3. In a heater for the purpose specified, the combination with a casing open at the bottom to be set down over the article to be heated, of an electric heater element depending from the top of said casing and having binding posts on the outside thereof, a cover for said binding posts detachably secured to the casing, and an electric conductor carried by said detachable cover for connection to said binding posts.

4. In a heater for the purpose specified, the combination with a casing to inclose the article to be heated, of a hollow tubular member of insulating material extending into the same, a bolt having its head housed in said tubular member and serving to fasten the same to the casing, and a heater element mounted on the outside of said member.

5. In a heater for the purpose specified, the combination with a casing to inclose the article to be heated, of a hollow tubular member of insulating material abutting at one end against the casing and extending into the same, said member having a large bore extending from its outer end through the greater portion of its length and a smaller bore extending through the remainder thereof, a bolt having its head housed in the larger bore of said tubular member and its shank extending through the smaller bore thereof for fastening the same to the casing, and a heater element mounted on the outside of said member.

In testimony whereof I have hereunto affixed my signature this 10th, day of September, 1920.

U D. STRAW.